Nov. 27, 1962 W. J. KINDERMAN 3,065,634
TEMPERATURE COMPENSATED BOILER LIQUID LEVEL GAUGE
Filed April 8, 1959 3 Sheets-Sheet 1

INVENTOR
WALTER J. KINDERMAN
BY
ATTORNEYS

Nov. 27, 1962 W. J. KINDERMAN 3,065,634
TEMPERATURE COMPENSATED BOILER LIQUID LEVEL GAUGE
Filed April 8, 1959 3 Sheets-Sheet 2
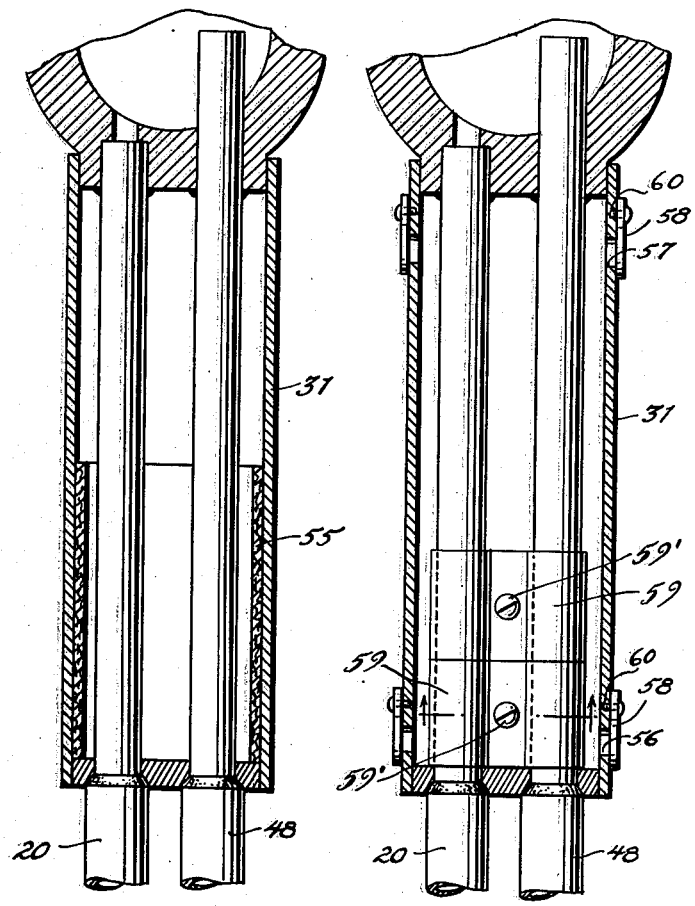
Fig. 3. Fig. 4.
Fig. 5.
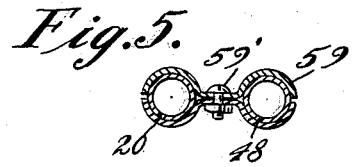
INVENTOR
WALTER J. KINDERMAN
BY
ATTORNEYS Nov. 27, 1962 W. J. KINDERMAN 3,065,634
TEMPERATURE COMPENSATED BOILER LIQUID LEVEL GAUGE
Filed April 8, 1959 3 Sheets-Sheet 3

INVENTOR
WALTER J. KINDERMAN
BY
ATTORNEYS

United States Patent Office 3,065,634
Patented Nov. 27, 1962

1

3,065,634
TEMPERATURE COMPENSATED BOILER LIQUID
LEVEL GAUGE
Walter J. Kinderman, Philadelphia, Pa., assignor to
Yarnall-Waring Company, Philadelphia, Pa., a corporation of Pennsylvania
Filed Apr. 8, 1959, Ser. No. 805,015
6 Claims. (Cl. 73—302)

The present invention relates to improved liquid level gauges for boilers.

A purpose of the invention is to obtain a more precise temperature compensation in a liquid level gauge for a boiler or the like.

A further purpose is to compensate more effectively for temperature when the boiler is operating for extended periods at relatively high or relatively low liquid level.

A further purpose is to place adjoining the constant head column and in heat transfer relation to it below the constant head, a heater column filled with steam to a predetermined level below the constant head and then filled with condensate below that point, and connected to the boiler substantially below the steam drum.

A further purpose is to use the heater column to draw off condensate and maintain the constant head.

A further purpose is to place a chamber filled with steam and forming the effective upper portion of the heater column around the upper part of the constant head column, and below a predetermined level beneath the constant head maintain condensate around or in heat transfer relation with the constant head column.

A further purpose is to employ heat insulation to regulate the heat transfer between the heater column and the constant head column.

A further purpose is to utilize ventilation to assist in regulating the heating effect from the heater column.

A further purpose is to provide variable heat conduction by clamps extending between the tubes of the respective columns.

Further purposes appear in the specification and in the claims.

In the drawings I have chosen to illustrate one only of the numerous embodiments in which the invention may appear, selecting the forms shown from the standpoints of convenience in illustration, satisfactory operation and clear demonstration of the principles involved.

FIGURE 3 is a fragmentary enlarged axial section of a modified form of jacket applied to the construction of FIGURE 1.

FIGURE 4 is an enlarged axial section of a further modified form of the jacket applied to the construction of FIGURE 1.

FIGURE 5 is a transverse section of FIGURE 4 through one of the calibration clamps.

Figures 1, 2:
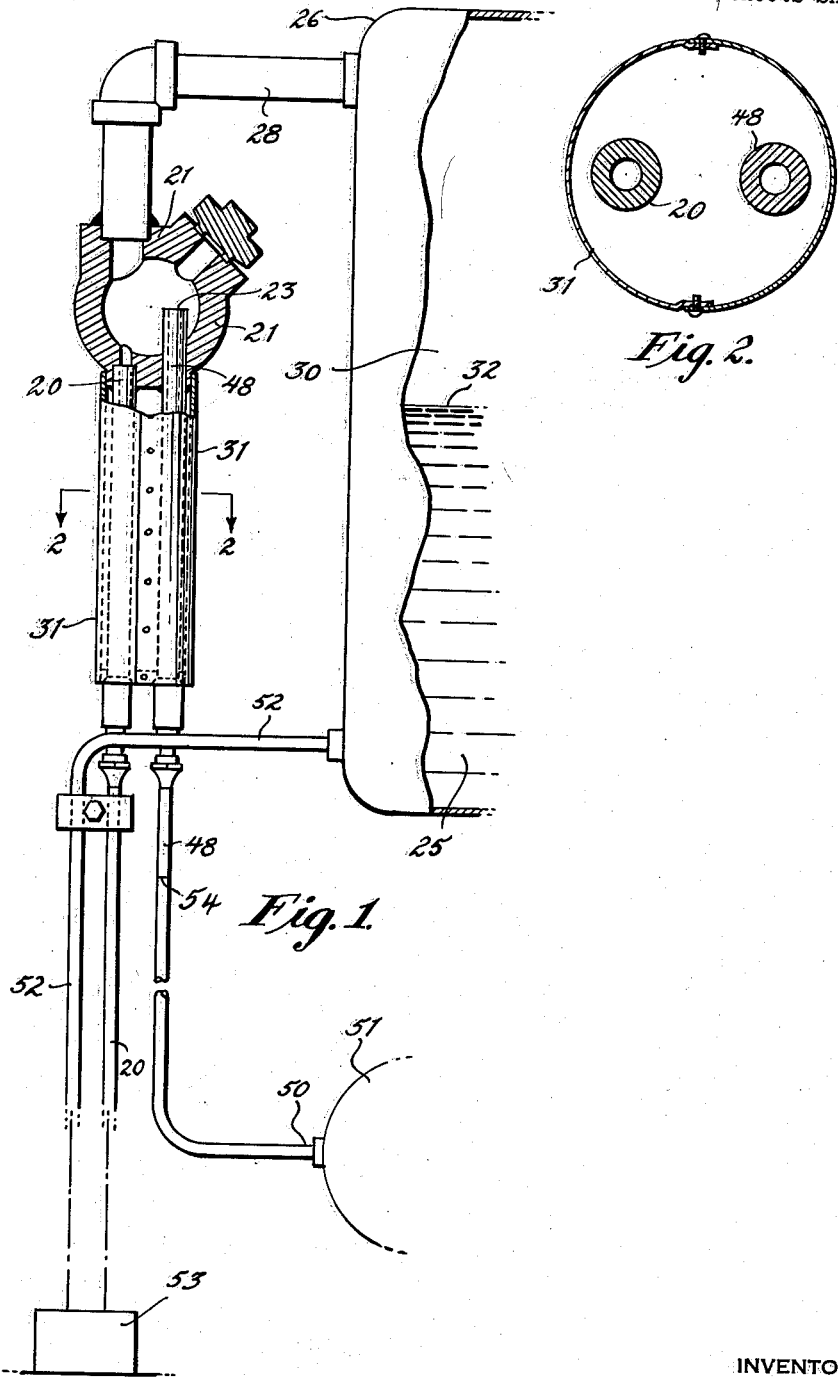
FIGURE 1 is a diagrammatic partially sectional view illustrating a preferred embodiment of the invention.
FIGURE 2 is an enlarged section of FIGURE 1 on the line 2—2.
Figure 6:
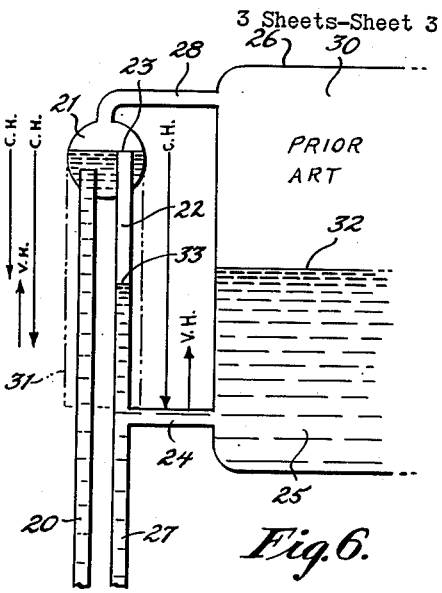
FIGURE 6 is a diagrammatic vertical sectional view of a prior art liquid level indicator.

Describing in illustration but not in limitation and referring to the drawings:

In the prior art, temperature compensators for liquid level gauges of boilers and the like have often comprised a construction as shown in FIGURE 6 in which a constant head column 20 extends into and connects with the bottom of a constant head chamber 21 and at the bottom of the constant head column connects to one side of the diaphragm of a differential pressure gauge not shown. The constant head is maintained by a variable head column 22 which extends up in the constant head chamber 21 to a position 23, which establishes the constant head by draining off all condensate above that level. The variable head column 22 connects at 24 into the interior of the boiler near the bottom of the water space 25 of the boiler steam drum 26, and the variable head column also has leg 27 which extends down and connects with the other side of the diaphragm of the differential pressure gauge. The top of the constant head chamber 21 is connected by pipe 28 with the steam space 30 at the top of the steam drum 26 of the boiler.

The portion of the constant head column 20 and the variable head column 22 beneath the constant head chamber and down to about the connection 24 is surrounded by a jacket 31 so that heat transfer is effectively maintained from the variable head column to the adjacent constant head column. If the liquid level in the boiler is at an intermediate position such as 32, the variable head column maintains a level possibly slightly below at 33 with steam above this level and condensate beneath that level.

With a temperature compensator of the character of FIGURE 6, accuracy of indication is maintained at the normal water level 32 by compensating for density of the short variable indicating water column 22 maintained at normal water level by causing corresponding total density changes in the water in the opposing constant head column 20. Since the constant head column 20 is of greater length it is necessary to have approximately half of the incremental density change per unit length of the constant head column 20 as compared to the similar conditions of the variable head column 22. Heat from the variable head column is radiated to the constant head column, since the two columns are adjacent and side by side and surrounded by the jacket 31.

Although this system is simple and quite satisfactory in many respects, it has one disadvantage which has long been recognized. Heat exchange between the variable head column and the constant head column with the water level normal permits highly accurate calibration and normal fluctuations in level of the variable head produce very little effect on the calibration unless the variation persists for extended periods of high water level or low water level. When such extended periods of high water level or low water level occur, the compensation is subject to variation due to change in heat transfer conditions.

Figure 7:
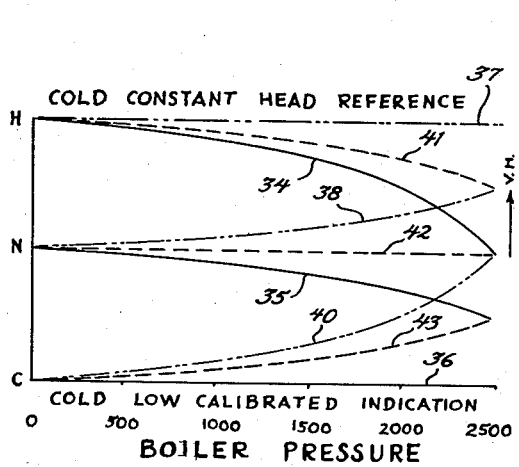
FIGURE 7 is a chart plotting liquid level as ordinate and boiler pressure as abscissa for the gauge of FIGURE 6.

FIGURE 7 shows a chart plotting as ordinate high, normal and low water level and as abscissa the boiler pressure. Curves 34, 35 and 36 plot for high, normal and low levels the cold condensate head calibration, while curves 37, 38 and 40 plot for high, normal and low water levels the hot (saturated temperature) constant head calibration. Curves 41, 42 and 43 plot for high, normal and low water levels at controlled internal temperature calibration.

Figure 8:
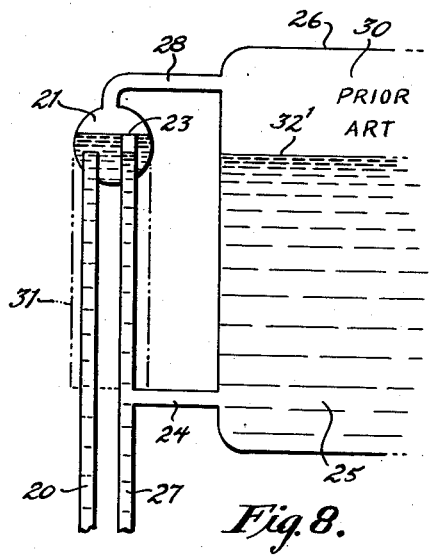
FIGURES 8 and 9 are views similar to FIGURE 6 showing the operation of a prior art liquid level gauge under special conditions.
Figure 9:
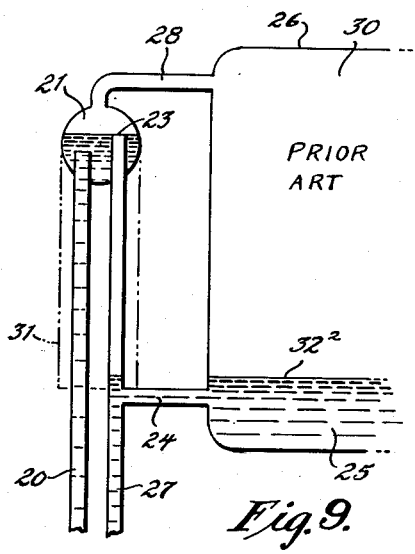
Figure 10:
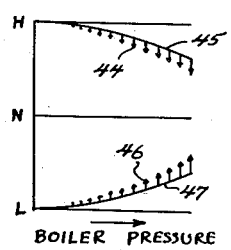
FIGURE 10 is a chart similar to FIGURE 7, showing the special conditions of FIGURES 8 and 9.

FIGURE 8 shows the condition at high water level 32', which is maintained persistently high. The constant head column cools down as the level rises, since more and more of the variable head column is filled with condensate rather than steam. Accordingly the high reading is lowered as suggested in FIGURE 10 by the arrows 44 applied to the curve 45. On the other hand, with a low water level 32² as shown in FIGURE 9, which is maintained persistently low, the constant head column becomes hotter as the level drops, since more and more of the variable head column is filled with steam rather than condensate. The errors indicated by arrows 46 apply to curve 47 in the chart of FIGURE 10.

The errors just described can be corrected in accordance with the present invention by stabilizing heat exchange between the columns to substitute for the variable temperature compensation of the prior art. In accordance with the invention, the variable head column no longer acts on one side of the diaphragm of the differential pressure gauge, but is differently connected and differently used. At its lower end it is not connected into the steam drum of the boiler at the water space, but is connected to the boiler interior substantially below the steam drum and suitably at the mud drum.

One very simple and preferable embodiment of the invention lowers the variable head in what was formerly the variable head column to a level below the compensating unit and thereby maintains this column (which is better described as a heater column) constantly filled with steam to a level independent of the water level in the boiler, so that constant heat transfer from the steam in this heater column occurs to the constant head column.

A convenient way to lower the level in the heater column is by eliminating the return connection to the steam drum and connecting the lower end of the heater column to the boiler at a level sufficiently below the steam drum to permit lowering of the level of the heater column by reason of its lower temperature and the fact that its water therefore is of higher density as compared to the density of saturated water in the boiler.

As best seen in FIGURES 1 and 2, the constant head 23 is maintained by heater column 48 which bears the same relation to the constant head chamber as the variable head column of former practice and extends down within the jacket 31 in heat transfer relation to the constant head column 20. Unlike the variable head column of former practice, the heater column 48 is not connected to the steam drum of the boiler at all at its bottom, although of course the connection 28 from the steam space of the steam drum to the constant head chamber is provided at the top. The bottom of the heater tube 48 is connected at 50 to the boiler substantially below the steam drum, and suitably to the interior of the mud drum 51.

A new connection 52 is provided from the water space of the steam drum of the boiler, suitably near the bottom, to one side of the diaphragm of the differential pressure gauge, being connected to the bottom of the constant head column 20 as in former practice. The differential pressure gauge is suitably of the type of my U.S. Patents Nos. 2,509,644, granted May 30, 1950, and 2,617,300, granted November 11, 1952.

In operation of the device of FIGURES 1 and 2, it will be evident that regardless of the level 32 of the water in the boiler, the water in the heater column is at a suitably low level 54 so that the constant head column 20 below the constant head chamber is in heat transfer with steam at all times.

The extent of heating of the constant head column is calibrated so that the desired temperature correction is imparted to the differential pressure gauge which operates more accurately because the constant head column maintains a more accurate pressure on one side of the gauge diaphragm.

The compensating unit increases the temperature of the constant head column to approximately meet the calibration requirements for flat glass insert type gauges subject to normal cooling. Calibration can be controlled by changing the spacing between the constant head column and the heater column within the jacket.

To adjust the temperature compensation to meet calibration requirements for water gauges where the compensation mean temperature of the liquid approaches or reaches saturation, the calibration can be adjusted by inserting an insulating sleeve 55 such as asbestos in the lower part of the jacket 31 and extending it up a predetermined distance as required by the calibration (see FIGURE 3).

For further adjustment of the calibration, or as an alternative, I provide ports 56 (FIGURE 4) at the bottom of the jacket 31 suitably distributed around the circumference and ports 57 distributed around the top of the jacket. Each of the ports has a swinging closure 58 pivoted on a frictionally tight pivot 60 so that in calibration ports can be opened and allowed to remain open selectively to give a ventilating and cooling effect so as to permit controlled cooling of the constant head column to compensate for overheating.

As an alternative means of calibration adjustment, heat conducting metallic clamps 59 consisting of separated halves united by bolts 59' as best seen in FIGURE 5 are applied between the tubes 20 and 48. These clamps are of limited width, and one, two or more clamps as desired are used to increase the heat transfer between the tubes to increase the temperature of the constant head in tube 20. Any desired number of clamps may be used to obtain the proper degree of compensation.

Although it will be appreciated that there will be an equilibrium heat transfer condition which will closely compensate for the normal level corresponding to steam temperature as applied to a boiler, this is not always the compensation objective. In many cases the purpose is to duplicate the reading of the water gauge on the boiler where the temperature of the water in the gauge is below steam temperature and the reading is therefore below the corresponding level in the boiler drum. Under these conditions a compensating effect proportional to the condition existing in the gauge is required to meet the specific thermal conditions of the gauge installation. The various measures described are useful in obtaining a degree of compensation to suit the particular requirements.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a liquid level gauge for use with a boiler having a steam drum provided with a steam space and a water space, and also having a second water space below the steam drum, a constant head chamber, a constant head column extending downward from the constant head chamber and adapted to maintain a constant head in the constant head chamber, a heater column communicating with the interior of the constant head chamber, the constant head chamber being adapted to be connected at the top with the top of the steam space of the boiler, the heater column being adapted to be connected at the bottom to said second water space of the boiler below the steam drum, variable and adjustable means to control heat transfer relations between the constant head column and the heater column essentially over the extent of the range of indication of said gauge, and a differential pressure gauge connected at one side to the lower end of the constant head column and connected at the other side to the water in the steam drum.

2. A gauge of claim 1, in which the heater column extends separately from the constant head column into the constant head chamber in side-by-side relation and at its top drains the constant head column and maintains the constant head.

3. A gauge of claim 2, in combination with a heating jacket around the constant head column and the heater column below the constant head.

4. A gauge of claim 3, wherein the variable and adjustable means to control heat transfer comprises insulation around the heating jacket.

5. A gauge of claim 3, wherein the variable and adjustable means to control heat transfer comprises ventilation ports in the heating jacket.

6. A gauge of claim 3, wherein the variable and adjustable means to control heat transfer relations comprises heat conductive clamping means extending between the constant head column and the heater column.

References Cited in the file of this patent

UNITED STATES PATENTS

| 2,337,171 | Winton | Dec. 21, 1943 |
| 2,747,404 | Van Ham | May 29, 1956 |

FOREIGN PATENTS

| 61,735 | Austria | Oct. 25, 1913 |